Oct. 30, 1923. 1,472,712
H. G. ALTZ ET AL
TIRE VALVE TESTER
Filed Sept. 14, 1922
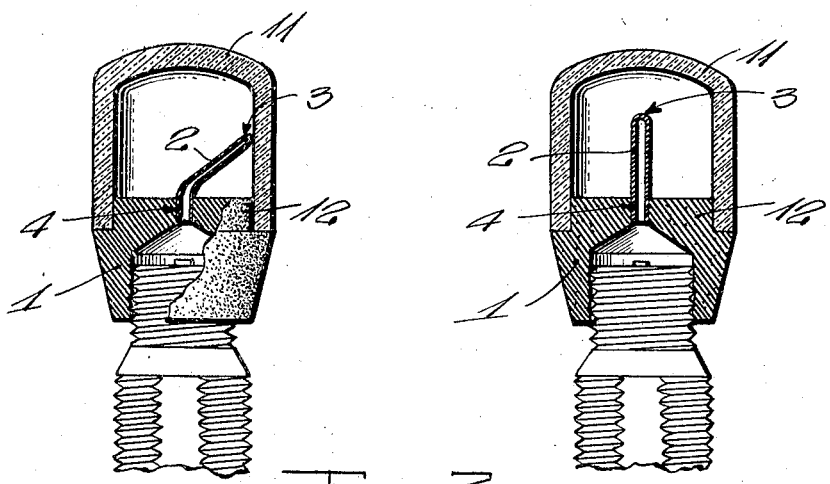
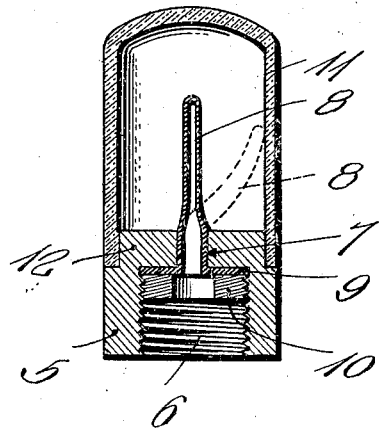
Inventors
Horace G. Altz
Fred Fearheiley Patented Oct. 30, 1923.

1,472,712

UNITED STATES PATENT OFFICE.

HORACE G. ALTZ AND FRED F. FEARHEILEY, OF EAST MOLINE, ILLINOIS.

TIRE-VALVE TESTER.

Application filed September 14, 1922. Serial No. 588,203.

*To all whom it may concern:*

Be it known that we, HORACE G. ALTZ and FRED F. FEARHEILEY, citizens of the United States, residing at East Moline, in the county of Rock Island and State of Illinois, have invented certain new and useful Improvements in Tire-Valve Testers; and we do declare the following to be a full, clear, and exact description of the invention, such as will enable others skilled in the art to which it appertains to make and use the same.

Our invention has for its object to provide an extremely simple and inexpensive, yet a sensitive and desirable device for testing tire valves, gas jets and the like, for leaks, the construction being such that even the smallest leaks may be found.

As the device is intended primarily for use in connection with pneumatic tires, a further object is to provide a simple and practicable construction well adapting the invention for this particular use.

With the foregoing in view, the invention resides in the novel subject matter hereinafter described and claimed, the description being supplemented by the accompanying drawings.

Figure 1 is a side elevation partly in section showing one form of our invention, the leak indicating tube being shown in its normally drooped position.

Figure 2 is a sectional view showing the manner in which the indicating tube is righted by the leakage of air from the valve and forms a relatively stiff indicating finger.

Figure 3 is a view similar to Fig. 2, but illustrating a different form of construction.

In Figs. 1 and 2, the numeral 1 designates a rubber cap adapted to fit over the end of a tire valve and engage the same in an air tight manner. The outer side of the cap 1 carries an elongated flexible tube 2 whose outer end 3 is closed while its inner end 4 is vulcanized or otherwise pivotally secured to the cap 1 and communicates with the interior of this cap. The tube 2 normally droops from a point of connection with the cap 1, under the influence of its own weight, as seen in Fig. 1. However, when the cap 1 is applied to a tire valve or the like and slight leakage takes place, the air or gas received in the tube will right the latter as indicated in Fig. 2, thus forming of this tube a relatively stiff indicating finger extending from the cap 1. It will thus be seen that leaks which could not otherwise be readily located, may be quickly and easily found by the use of our invention. Attention is directed to the fact that it is not necessary for the leak to be sufficient to rapidly inflate a relatively large sack, such as used by certain forms of indicators heretofore devised. Attention may also be directed to the fact that our device remains only temporarily upon the valve stem whenever it is desired to test the valve, instead of remaining permanently in place thereon. By the use of a normally drooping tube adapted to be righted by air pressure, the device is much more sensitive than if otherwise constructed.

In Fig. 3 we have illustrated a different form of construction in which the cap 5 is internally threaded as indicated at 6 for engagement with the valve or the like, the head of said cap having a central opening 7 through which the inner end of the flexible tube 8 passes, the inner end of said tube being provided with an outstanding flange 9 clamped against the cap head by a gasket 10 which is threaded in said cap. The action of this device is the same as that above described, the only difference being that the cap is of metal and is threaded instead of being constructed of rubber intended merely to be slipped over the valve or the like.

Both forms of the invention may be provided either with or without a protecting hood 11 of transparent nature, being preferably formed of glass, the inner end of this hood being secured around the reduced head end 12 of the cap, in any suitable manner. The indicating tube normally leans or droops toward the side wall of the hood 11, but when air or gas enters said tube, it moves away from said wall into the form of an indicating finger within and entirely out of contact with the hood.

As excellent results may be obtained from the general arrangement shown and described, it is preferably followed, but within the scope of the invention as claimed, numerous minor changes may of course be made.

We claim:

1. A tire valve tester comprising a cap for temporary application to the end of the valve, and a normally elongated flexible tube carried by and disposed on the exterior of said cap, said tube being closed at its outer end and normally drooping laterally under its own weight from its point of connection with the cap, said tube being in communication with the interior of said cap, whereby a slight leak of air from the valve into said cap will right said tube and form thereof a relatively stiff indicating finger.

2. A structure as specified in claim 2, together with a transparent hood carried by said cap and spaced from the anchored end of the tube, said tube normally leaning toward the side wall of said hood but being movable away from said wall when air enters said tube.

In testimony whereof we have hereunto affixed our signatures.

HORACE G. ALTZ.
FRED F. FEARHEILEY.